United States Patent Office 3,048,598
Patented Aug. 7, 1962

3,048,598
PROCESS FOR PRODUCING 2-HYDROCARBON-2-DIOXENES
Willard J. Croxall and Norman D. Dawson, Elkhart, Ind., assignors to Miles Laboratories, Inc., Elkhart, Ind., a corporation of Indiana
No Drawing. Filed Feb. 23, 1960, Ser. No. 10,025
2 Claims. (Cl. 260—340.6)

This invention relates to new and useful heterocyclic compounds and to methods for their preparation. More specifically, the present invention relates to substituted dioxenes corresponding to the following general formula:

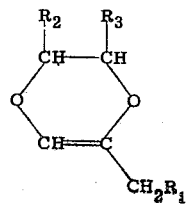

wherein $R_1$ is hydrogen, lower alkyl, lower alkenyl or phenyl groups; $R_2$ and $R_3$ are hydrogen, lower alkyl or phenyl groups.

The compounds of this invention can be conveniently formed by refluxing appropriate alkynyl β-hydroxyethyl ethers of the general formula:

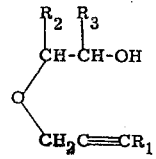

wherein $R_1$ to $R_3$ have the meanings given to them above, with potassium hydroxide in an organic solvent, such as xylene, toluene, decalin, dibutyl Carbitol, dibutyl Cellosolve, etc. In consequence of this treatment the above alkynyl ethers are cyclized to yield substituted dioxenes of the formula given hereinabove.

The alkynyl β-hydroxyethyl ethers used in this reaction as starting materials can be produced by reacting commercially available primary acetylenically unsaturated alcohols, 1-alkyn-3-ols, with lower alkylene oxides, such as ethylene oxide, propylene oxide or butylene oxide, or with styrene oxide or the like in the presence of boron fluoride (BF₃) as a catalyst. This condensation reaction can be represented graphically by the following equation:

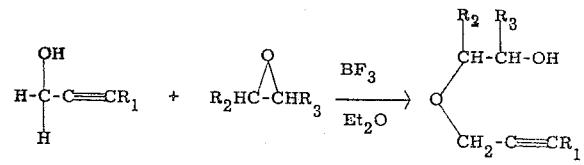

wherein $R_1$ to $R_3$ are as indicated above.

An alternate method of synthesis of the starting materials contemplates the use of lower alkylene chlorohydrins in the presence of potassium hydroxide in accordance with the following equation:

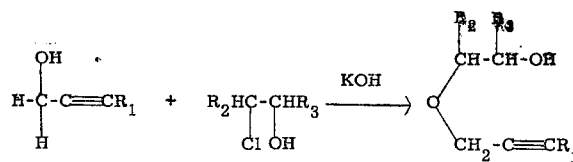

wherein $R_1$ to $R_3$ have the significance ascribed to them above. This alternate method is exemplified in greater detail by the following example:

EXAMPLE I

Preparation of 3-(β-hydroxyethoxy)-1-propyne by alternate method.—Propargyl alcohol (1-propyn-3-ol) (200 gms., 3.58 moles) was cooled to 10° C. and 56 gms. (1.0 mole) of KOH was added in portions. After solution of the KOH, ethylene chlorohydrin (56 gms., 1.0 mole) was added dropwise at a low temperature (8–14° C.). The ice bath was removed and the mixture warmed slowly. Potassium chloride separated as the temperature increased. After one hour at 70–80° C., the mixture was cooled to 20° C. and filtered. The clear filtrate was distilled under water pump vacuum using a ten-inch column. The excess propargyl alcohol was removed at 25–30° C./12–14 mm. The product was collected at 75–80° C./12–14 mm. Yield, 60–70 gm. (60–70%); refractive index ($n_D^{25}$), 1.4508.

The compounds of this invention are valuable due to their capability to polymerize or copolymerize with other polymerizable monomers to form polymers or copolymers having utility as adhesive materials, protective coatings and the like. More specifically, for example, when catalyzed with a small amount of boron fluoride, these dioxenes polymerize readily.

These compounds are further useful as intermediates. For instance, upon hydrogenation compounds are obtained having utility as specialty solvents for many organic compounds. It is evident that these compounds also undergo halogenation, particularly bromination and chlorination, and other addition reactions typical of unsaturated compounds.

The present invention is illustrated in greater detail by the following example. It is to be understood that the invention is not limited thereby.

EXAMPLE II

2-Methyl-2-Dioxene

Preparation of 3-(β-hydroxyethoxy)-1-propyne. — A three liter three-necked flask provided with a condenser, stirrer, thermometer and gas inlet tube was charged with 915 gms. (16.3 moles) of propargyl alcohol, 1-propyn-3-ol, and 2 moles of BF₃ in ether. Ethylene oxide (320 gms., 7.27 moles) was bubbled into the stirred solution while the temperature was maintained at 25–30° C. by external cooling. After standing overnight at ambient temperature, the mixture was neutralized with sodium methoxide. The excess propargyl alcohol (620 gms.) was recovered by atmospheric distillation of the reaction mixture. 3-(β-Hydroxyethoxy)-1-propyne was collected at 80–90° C./12–14 mm. The yield was 262 gms. (36%) based on the ethylene oxide. The refractive index of the colorless propargyl ether was ($n_D^{25}$) 1.4480.

Preparation of 2-methyl-2-dioxene.—A mixture of 150 moles of dibutyl Cellosolve and 5 gms. of potassium hydroxide was stirred and heated at 180° C. One hundred gms. (1.0 mole) of the above propargyl ether was dropped into the mixture under stirring over a 35 minute period. The product distilled out of the basic mixture as rapidly as it formed. After drying the distillate over sodium sulfate, it was distilled at atmospheric pressure through a twelve inch column packed with stainless steel saddles. The colorless 2-methyl-2-dioxene was collected at 114–115° C. and had a refractive index ($n_D^{25}$) 1.4375. The yield was 58.0 gm. (58.0%).

With respect to proof of structure, it can be conclusively demonstrated that the product of the above cyclization reaction is indeed 2-methyl-2-dioxene. For example, upon chlorination and hydrolysis of the cyclization product, ethylene glycol and pyruvic aldehyde are obtained. Moreover, it was shown that this material is not 2-vinyl-1,3-dioxolane which had different constants when unequivocally synthesized in accordance with the following equation:

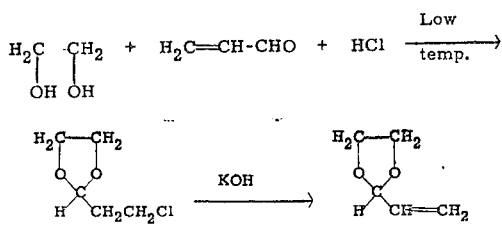

By hydrogenation, 2-ethyl-1,3-dioxolane was obtained which was also unequivocally synthesized from ethylene glycol and propionaldehyde in the presence of a resin catalyst (acid form Amberlite IR–140).

Likewise, it was demonstrated that the final product is not 2-methylene-1,4-dioxane, for that compound also had different constants and infra-red curves when produced according to the following unequivocal synthesis:

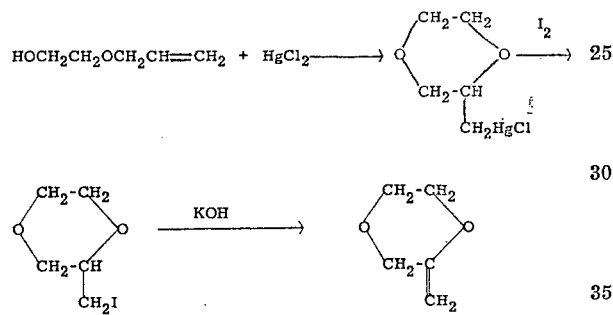

The 2-methylene-1,4-dioxane made according to this method, however, tends to stabilize by slow isomerization to 2-methyl-2-dioxene, but it is possible to separate these two isomers by gas chromotography.

It must also be assumed that a 2-methylene-1,4-dioxane is found in the practice of the present inventive process but that under the given reaction conditions determined by both the presence of KOH and high temperatures 2-methylene-1,4-dioxane is immediately converted into the more stable 2-methyl-2-dioxene form.

What is claimed is:

1. The method of producing a substituted heterocyclic compound having the formula

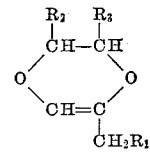

wherein $R_1$ is a member selected from the group consisting of hydrogen, lower alkyl, lower alkenyl and phenyl groups and $R_2$ and $R_3$ are members selected from the group consisting of hydrogen, lower alkyl and phenyl groups, which comprises heating at a temperature of from 100 to 200° C. a compound of the formula

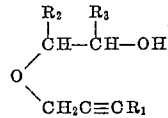

with potassium hydroxide in an organic solvent and taking off overhead the desired product.

2. The method of producing 2-methyl-2-dioxene which comprising heating at a temperature of from 170 to 175° C. 3-(β-hydroxyethoxy)-1-propyne with potassium hydroxide in an organic solvent and taking off overhead 2-methyl-2-dioxene.

References Cited in the file of this patent
UNITED STATES PATENTS
2,807,629    Bell _____ Sept. 24, 1957